J. REID.

MACHINE FOR TRUSSING BARRELS.

No. 10,479. Reissued May 13, 1884.

*Witnesses:*
A. H. Betz.
Chas. T. Heyes.

*Inventor:*
John Reid,
By T. C. Bricht,
Attorney.

N. PETERS, Photo-Lithographer, Washington, D. C.

UNITED STATES PATENT OFFICE.

JOHN REID, OF ALLEGHENY CITY, PENNSYLVANIA.

MACHINE FOR TRUSSING BARRELS.

SPECIFICATION forming part of Reissued Letters Patent No. 10,479, dated May 13, 1884.

Original No. 132,601, dated October 29, 1872. Application for reissue filed November 15, 1881.

*To all whom it may concern:*

Be it known that I, JOHN REID, of Allegheny City, in the county of Allegheny and State of Pennsylvania, have invented certain new and useful Improvements in Machines for Trussing Barrels, &c.; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to machines or apparatus for trussing barrels or other such like articles; and the object is to do this in an expeditious and perfect manner and in one operation; and the invention consists in the construction and arrangement of machinery or apparatus in which two cones are moved in opposite directions, or one being made stationary and the other movable, by any suitable mechanism, the staves being supported on or by said cones, as also the trussing-straps, and to be used in the construction or trussing of barrels or such like articles.

In order that my invention may be properly understood, I will describe the construction and operation thereof, reference being had to the accompanying drawings and the letters of reference marked thereon.

Figure 1:
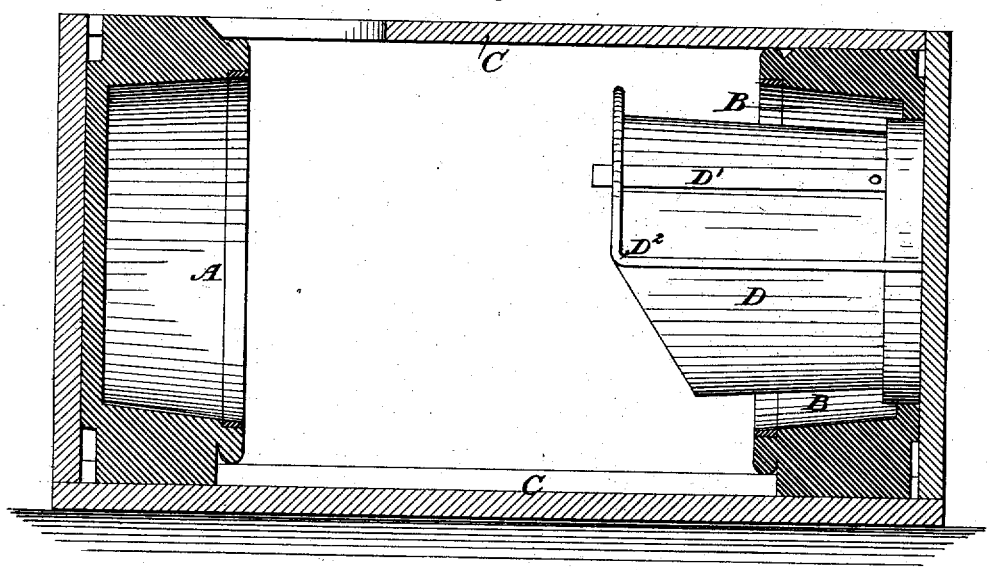
Figure 2:
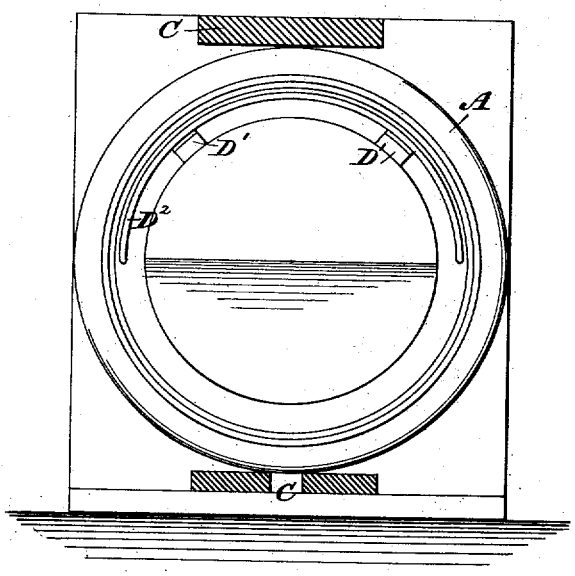

In the accompanying drawings, Figure 1 is a longitudinal section of my machine or apparatus for trussing barrels. Fig. 2 is a cross-section of the same.

In the drawings, A and B are hollow cones, placed horizontally and arranged opposite to each other, and supported by the guide-bars C, forming part of the main frame of the machine. During the operation of trussing, the said cones A and B are moved toward the center of the machine and withdrawn from the same by any suitable reciprocating device or mechanism; or, if required, but one cone may be movable and the other stationary. From the main part of the machine projects a curved frame, D, to which are attached springs D′, of suitable construction, kept in tension by the pushing forward and withdrawal of a curved bar, $D^2$.

The mode of operating with the machine is as follows: The cones A and B are drawn apart to a distance a little less than the length of the staves to be used, and the springs let out as wide as the largest diameter of the required barrel. The barrel-hoops are then placed in the recesses in the cones A and B cut for that purpose. The staves are then placed or built around the springs D′ and curved bar $D^2$, and the bottom or one end of the cask may be placed in or near the end of the staves, which rest in the cone A. Both of the cones should then be moved toward each other simultaneously by any suitable means until the trussing-hoops are made tight on the barrel. The cones are then drawn back to their former position, leaving the hoops encircling said vessels, which are then removed.

Having thus described my invention, what I claim, and desire to secure by Letters Patent, is—

1. The mode of building barrels, consisting in placing the staves around springs and a curved bar, and then moving or converging two cones or their equals with truss-hoops toward each other simultaneously, or in one operation, and finally withdrawing the same from the finished article, substantially as set forth.

2. A machine for trussing barrels, having two cones moved toward and from each other by suitable mechanism, said cones containing the binding or truss hoops, in combination with springs and a curved bar holding the staves in position, substantially as herein shown and described, for the purposes set forth.

In testimony that I claim the foregoing I have hereunto set my hand this 16th day of August, 1881.

JOHN REID.

Witnesses:

CHAS. T. FLEEGE,

D. NEILLIE.